(12) United States Patent
Wang et al.

(10) Patent No.: US 12,147,895 B2
(45) Date of Patent: Nov. 19, 2024

(54) SYSTEM AND METHOD FOR FINDING AND CLASSIFYING PATTERNS IN AN IMAGE WITH A VISION SYSTEM

(71) Applicant: Cognex Corporation, Natick, MA (US)

(72) Inventors: Lei Wang, Wayland, MA (US); Vivek Anand, Chelmsford, MA (US); Lowell D. Jacobson, Grafton, MA (US); David Y. Li, West Roxbury, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 18/103,432

(22) Filed: Jan. 30, 2023

(65) Prior Publication Data

US 2024/0005148 A1     Jan. 4, 2024

Related U.S. Application Data

(63) Continuation of application No. 16/433,602, filed on Jun. 6, 2019, now Pat. No. 11,568,629.

(60) Provisional application No. 62/793,364, filed on Jan. 16, 2019, provisional application No. 62/681,619, filed on Jun. 6, 2018.

(51) Int. Cl.
*G06N 3/08*      (2023.01)
*G06F 18/214*     (2023.01)
*G06V 10/44*     (2022.01)
*G06V 10/50*     (2022.01)
(Continued)

(52) U.S. Cl.
CPC ............ *G06N 3/08* (2013.01); *G06F 18/2148* (2023.01); *G06V 10/44* (2022.01); *G06V 10/454* (2022.01); *G06V 10/50* (2022.01); *G06V 10/82* (2022.01); *G06V 10/7553* (2022.01)

(58) Field of Classification Search
None
See application file for complete search history.

(56) References Cited

U.S. PATENT DOCUMENTS 7,668,388 B2    2/2010    Bryll
8,103,085 B1 *   1/2012    Zadeh ................... G06T 7/001
                                                           382/141
(Continued)

FOREIGN PATENT DOCUMENTS

CN        106529468      3/2017
CN        108108731      6/2018
(Continued)

*Primary Examiner* — Delomia L Gilliard
(74) *Attorney, Agent, or Firm* — Loginov & Associates, PLLC; William A. Loginov (57) ABSTRACT

This invention provides a system and method for finding patterns in images that incorporates neural net classifiers. A pattern finding tool is coupled with a classifier that can be run before or after the tool to have labeled pattern results with sub-pixel accuracy. In the case of a pattern finding tool that can detect multiple templates, its performance is improved when a neural net classifier informs the pattern finding tool to work only on a subset of the originally trained templates. Similarly, in the case of a pattern finding tool that initially detects a pattern, a neural network classifier can then determine whether it has found the correct pattern. The neural network can also reconstruct/clean-up an imaged shape, and/or to eliminate pixels less relevant to the shape of interest, therefore reducing the search time, as well significantly increasing the chance of lock on the correct shapes.

20 Claims, 7 Drawing Sheets

(51) Int. Cl.
*G06V 10/75* (2022.01)
*G06V 10/82* (2022.01)

(56) References Cited

U.S. PATENT DOCUMENTS

| | | | |
|---|---|---|---|
| 8,165,407 | B1 | 4/2012 | Khosla |
| 8,379,940 | B2 | 2/2013 | Wechsler |
| 8,892,495 | B2 | 11/2014 | Hoffberg |
| 9,015,092 | B2 | 4/2015 | Sinyavskiy |
| 9,349,076 | B1 | 5/2016 | Liu |
| 9,799,098 | B2 | 10/2017 | Seung |
| 9,842,253 | B2 | 12/2017 | Dubuque |
| 10,019,653 | B2 | 7/2018 | Wilf |
| 10,083,523 | B2 | 9/2018 | Versace |
| 10,108,850 | B1 | 10/2018 | Das |
| 10,504,020 | B2 | 12/2019 | Trenholm |
| 10,579,875 | B2 | 3/2020 | Dal Mutto |
| 10,657,451 | B2 | 5/2020 | Thomas |
| 10,810,452 | B2 | 10/2020 | Adams |
| 2007/0201730 | A1 | 8/2007 | Masaki |
| 2008/0069400 | A1 | 3/2008 | Zhu |
| 2012/0147149 | A1* | 6/2012 | Liu ............ G06T 7/75 348/E13.001 |
| 2012/0148145 | A1* | 6/2012 | Liu ............ G06T 7/80 382/154 |
| 2014/0343842 | A1* | 11/2014 | Ranganathan ......... G01C 21/30 701/472 |
| 2015/0213599 | A1* | 7/2015 | Buzaglo ............. G06V 10/454 382/128 |
| 2017/0098172 | A1 | 4/2017 | Ellenbogen |
| 2017/0161545 | A1 | 6/2017 | Champlin |
| 2017/0276243 | A1 | 9/2017 | Matsubara |
| 2018/0121805 | A1 | 5/2018 | Stone |
| 2018/0150684 | A1 | 5/2018 | Wang |
| 2018/0165554 | A1 | 6/2018 | Zhang |
| 2018/0204111 | A1 | 7/2018 | Zadeh |
| 2018/0315199 | A1 | 11/2018 | Socek |
| 2018/0322623 | A1 | 11/2018 | Memo |
| 2018/0330504 | A1* | 11/2018 | Karlinsky ............... G06T 7/74 |
| 2019/0122378 | A1 | 4/2019 | Aswin |
| 2019/0325621 | A1 | 10/2019 | Wang |

FOREIGN PATENT DOCUMENTS

| | | |
|---|---|---|
| JP | 07037041 A | 7/1995 |
| JP | 2003110298 | 4/2003 |
| JP | 2007220004 | 8/2007 |
| JP | 2015095042 | 5/2015 |
| JP | 2017172627 | 9/2017 |
| WO | 2016191462 | 12/2016 |
| WO | 2018076023 | 4/2018 |

* cited by examiner

SYSTEM AND METHOD FOR FINDING AND CLASSIFYING PATTERNS IN AN IMAGE WITH A VISION SYSTEM

RELATED APPLICATIONS

This application is a continuation of co-pending U.S. patent application Ser. No. 16/433,602, entitled SYSTEM AND METHOD FOR FINDING AND CLASSIFYING PATTERNS IN AN IMAGE WITH A VISION SYSTEM, filed Jun. 6, 2019, which claims the benefit of U.S. Provisional Application Ser. No. 62/793,364, entitled SYSTEM AND METHOD FOR FINDING AND CLASSIFYING PATTERNS IN AN IMAGE WITH A VISION SYSTEM, filed Jan. 16, 2019, and claims the benefit of U.S. Provisional Application Ser. No. 62/681,619, entitled SYSTEM AND METHOD FOR FINDING AND CLASSIFYING PATTERNS IN AN IMAGE WITH A VISION SYSTEM, filed Jun. 6, 2018, the teachings of each of which applications are incorporated herein by reference.

FIELD OF THE INVENTION

This invention relates to machine vision systems and methods, and more particularly to pattern search and recognition tools

BACKGROUND OF THE INVENTION

Machine vision systems, also termed "vision systems" herein, are used to perform a variety of tasks in a manufacturing environment. In general, a vision system consists of one or more cameras with an image sensor (or "imager") that acquires grayscale or color images of a scene that contains an object under manufacture. Images of the object can be analyzed to provide data/information to users and associated manufacturing processes. The data produced by the image is typically analyzed and processed by the vision system in one or more vision system processors that can be purpose-built, or part of one or more software application(s) instantiated within a general purpose computer (e.g. a PC, laptop, tablet or smartphone).

Common vision system tasks include alignment and inspection. In an alignment task, vision system tools, such as the well-known PatMax® system commercially available from Cognex Corporation of Natick, MA, compares features in an image of a scene to a trained (using an actual or synthetic model) pattern, and determines the presence/absence and pose of the pattern in the imaged scene. This information can be used in subsequent inspection (or other) operations to search for defects and/or perform other operations, such as part rejection.

It is desirable to enhance the performance of traditional pattern-finding tools, which can include a predetermined list of searchable patterns (e.g. circles, squares, image of a screw, etc.). Often, such tools may fail to properly discriminate between certain trained patterns that have subtle differences (e.g. a circle vs a circle with a small notch).

SUMMARY OF THE INVENTION

This invention overcomes disadvantages of the prior art by providing a system and method for finding patterns in images that incorporates neural network (also termed "neural net") classifiers (sometimes also termed "analyzers"). A pattern finding tool is coupled with a classifier that can be run before or after the tool to have labeled pattern results with sub-pixel accuracy. In the case of a pattern finding tool that can detect multiple templates, its performance is improved when a neural net classifier informs the pattern finding tool to work only on a subset of the originally trained templates. Alternatively, the pattern-finding tool's performance can be improved when using the neural network to reconstruct or cleanup the image before running the pattern finding tool. In additional, a neural network can be used to compute weighted value for each pixel in the image based on the likelihood of that pixel belonging to the pattern to be matched. Similarly, in the case of a pattern finding tool that initially detects a pattern, a neural net classifier can then determine whether it has found the correct pattern or not.

In an illustrative embodiment, a system and method for pattern-finding in an image comprises a pattern-finding tool that is trained based upon one or more template(s) related to one or more training image(s) containing a pattern of interest. A neural net classifier is trained on the one or more training image(s) and a template matching process operates during runtime, in which, either, (a) the trained neural net classifier provides one or more template(s) based on a runtime image to the pattern-finding tool, and the trained pattern finding tool performs pattern matching based upon the one or more template images combined with the runtime image, or (b) the trained pattern-finding tool provides found patterns from the runtime image to the trained neural net classifier, and the trained neural net classifier performs pattern-matching based on the found patterns and the runtime image. The pattern-finding tool is adapted to be trained using a plurality of the templates, or on a single template. The neural net comprises a convolutional neural network (CNN).

In a further embodiment, a system and method for pattern-finding in an image is provided, and includes a neural network trained to locate one or more candidate shapes in an image and arranged to identify probability of the presence of the one or more shapes in the image during runtime operation. The neural network thereby generates (a) a weighted mask having features of the one or more candidate shapes that exceed a probability threshold and/or (b) a reconstructed image in which the features of a model of the one or more candidate shapes are substituted in the image where the neural network analyzer identifies presence of the features of the one or more candidate shapes that exceed the probability threshold. Illustratively, a pattern-finding tool is trained using one or more models relative to the one or more candidate shapes to find the one or more candidate shapes in (a) the weighted mask and/or (b) the reconstructed image. The neural network can define the weighted mask so that each pixel therein has a score related to identification of the one or more shapes. The reconstructed image can be defined as a binary image. Illustratively, the neural network analyzer provides data as to presence of a type of the one or more candidate shapes to the pattern-finding tool and the pattern finding tool limits processes to those related to locate the type. In general, the neural network can comprise a convolutional neural network (CNN).

BRIEF DESCRIPTION OF THE DRAWINGS

The invention description below refers to the accompanying drawings, of which.

DETAILED DESCRIPTION

I. System Overview

Figure 1:
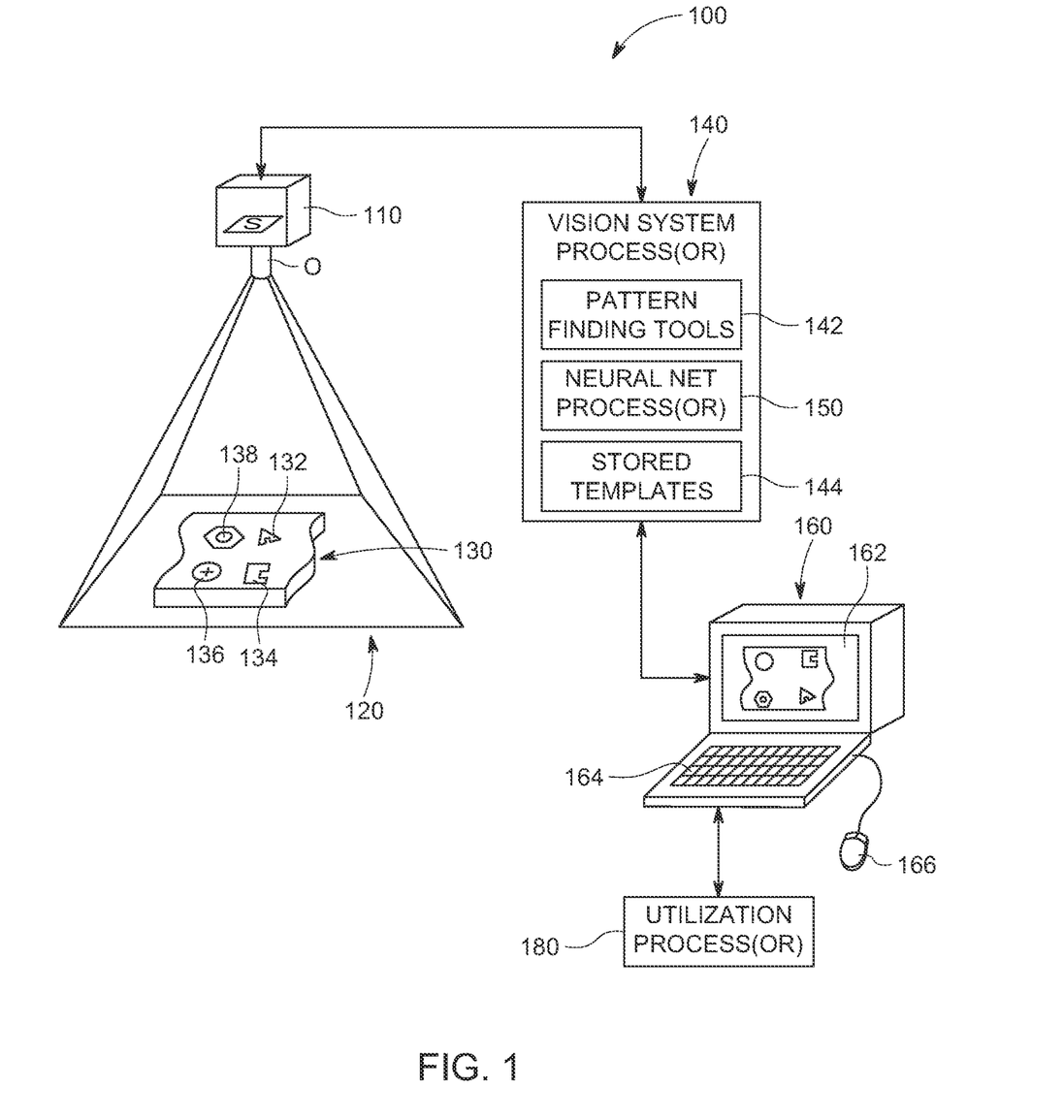
FIG. 1 is a diagram of a vision system arranged to analyze an imaged object containing differing shapes and/or patterns using a pattern finding tool in combination with neural network classifiers.

FIG. 1 shows a generalized vision system arrangement 100 for use according to the illustrative system and method. The vision system can be implemented in any acceptable environment, including for part/surface inspection, robot control, part alignment, and the like. The system includes at least one vision system camera assembly 110 having optics O and an image sensor (also termed a "sensor" or "imager") S that can also include on-board or separate illumination (not shown). The camera assembly images a scene 120 that can include one or more stationary or moving object(s) 130. In this example, the object includes an outline shape, as well as a variety of internal shapes 132, 134, 136 and 138 of regular and irregular geometry. More generally, the patterns can be any geometric shape or an arbitrary 2-D image of an object.

The camera assembly 110 and associated sensor S are interconnected to a vision system processor 140 that can be located entirely or partly within the camera assembly 110 or can be located in a separate processing device, such as a server, PC, laptop, tablet or smartphone (computer 160). The computing device can include an appropriate user interface, such as a display/touchscreen 162, keyboard 164 and mouse 166.

Illustratively, the vision system process(or) 140 operates a variety of vision system tools and related software/firmware to manipulate and analyze acquired and/or stored images of the object 130 during runtime. The process(or) 140 can be trained to function according to particular parameters and to recognize particular shapes found in the object using a training procedure. The process(or) 140 includes various vision system components including pattern finding tools 142, such as those found in the above-described PatMax® software package and variations thereof—for example PatMax® Multi-Model. The pattern finding tools can employ trained patterns or standard shape patterns (squares, circles, etc.), which are contained in training templates 144. As described below, the vision system process(or) also includes, or interfaces with, a neural network process(or) 150. The neural network process(or) (also termed "neural net") 150 operates on various patterns in the form of classifiers to enhance the pattern finding speed and performance of the system 100.

Results of pattern finding can be transmitted to a user via the computer interface 162, and/or to another downstream utilization device or process(or) 180. Such device or process(or) can include an assembly robot controller, line inspection, part inspection/rejection, quality control, etc.

It is recognized that a traditional approach to pattern matching entails training a conventional pattern-matching tool, such as PatMax® or PatMax® Multi-Model using a model image with shapes or features of interest. During runtime, the pattern-matching tool runs through one or more (possibly all) of the trained templates in an effort to locate a correct match to the trained pattern in an acquired image of the object under inspection.

Conversely, the present embodiment provides a smart pattern-finding tool that utilizes neural net processes to enhance a traditional pattern finding tool, thereby providing it with the ability to automatically label found patterns in the tool results or use the associated neural net classifier to reliably detect a pattern. In operation, this approach allows training of the smart pattern-finding tool on a database of images containing templates. Post-training, during runtime, the smart pattern finder tool combines the best features of a traditional pattern finder and a neural net classifier to provide correctly labeled pattern finding results with highly accurate poses (location, scale, rotation, etc.).

II. Pattern-Finding Using Neural Network to Refine Search

Figure 2:
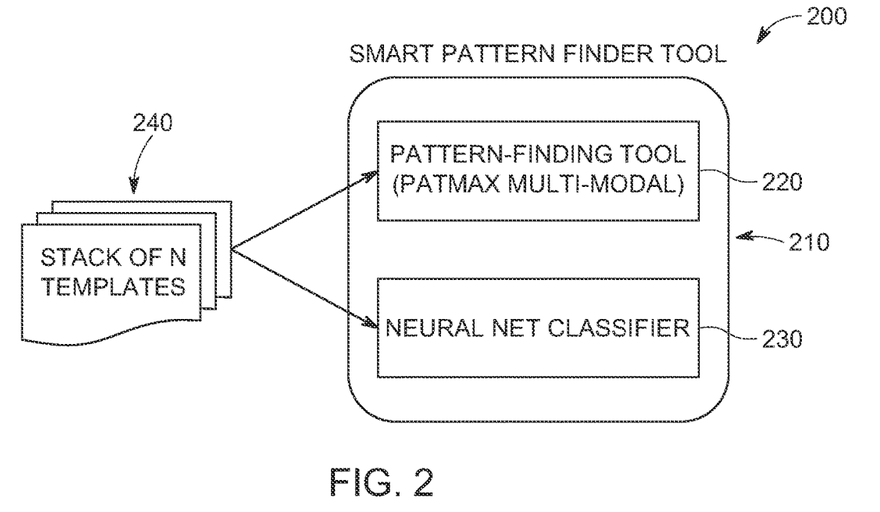
FIG. 2 is a block diagram showing the training procedure for a smart pattern-finding tool including a neural network classifier and a pattern-finding tool that are trained on the same set of one or more image templates.

Reference is made to FIG. 2, which shows a block diagram representing a training time procedure 200, prior to runtime. The tool 210 includes a conventional pattern-finding tool 220 and an associated neural net classifier that assists the pattern finding tool in finding the correct pattern among a set/plurality of trained patterns (templates) 240.

More particularly, at training time, the traditional pattern finding tool 220 (e.g. PatMax® Multi-Model) is trained on one or more template images. Concurrently, the neural net classifier (e.g. a convolutional neural network (CNN)) 230 is trained on multiple example images of the pattern represented by each template. The neural net classifier 230 is trained to process an input image and report the sub-set of template labels found in the input image.

Figure 3:
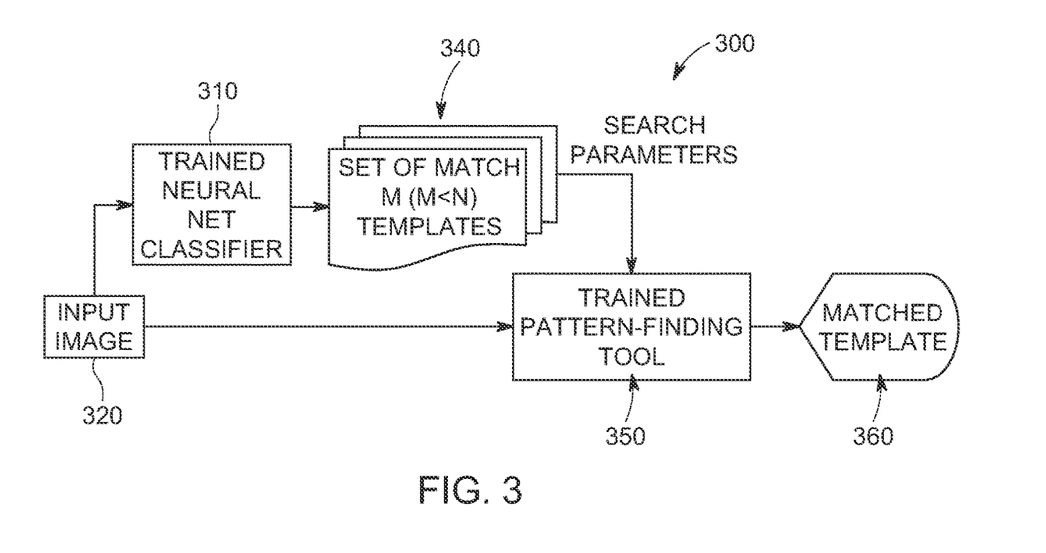
FIG. 3 is a block diagram of a runtime operation on an input image using the trained smart pattern-finding tool of FIG. 2 where the neural net classifier runs before the pattern-finding tool.

FIG. 3 depicts a runtime procedure (using a pre-classification) 300, in which the trained neural net classifier 310 first runs on the input runtime image (acquired by the camera 110 and/or stored from a previous acquisition) 320, and determines probabilities for each template. The smart pattern finder tool filters out which results are best and then informs the trained pattern finding tool 350 to work on these matched subsets of M templates 340 rather than full set of N templates (240 in FIG. 2). As such the subset of M best-fitting templates 340 are provided as the search parameters to the trained pattern-finding tool 350. The input image 320 is provided to the pattern-finding tool 350 and the search parameters are used to yield matched-template results 360 as an output of the tool 350. These results can be displayed to the user or employed in downstream utilization operations (e.g. part alignment, inspection, etc.). Advantageously, this process 300 reduces the amount of computation that would normally entailed in generating a matched template.

A variety of proprietary and commercially available (e.g. open source) neural network architectures and associated classifiers can be employed in accordance with the embodiments herein. For example, TensorFlow, Microsoft CNTK.

An exemplary application in which the above-described training and runtime procedures 200 and 300 can be used is in finding the correct fiducial where the shape of a fiducial can vary across different parts (cross, diamond, etc.). Illustratively, the traditional pattern-finding tool is trained on the template image representing each possible fiducial pattern. In addition, a neural net classifier (e.g. TensorFlow) is trained on multiple images showing the variation in appearance of each fiducial pattern, along with the label associated with each fiducial pattern. At runtime, first the trained neural net classifier is run which returns the set of labels found in the runtime image. Using this information, the system can inform the pattern-finding tool (e.g. PatMax® MultiModel) to run only on the set of templates represented by labels which were generated by neural net classifier, thereby speeding alignment and producing a more reliable result.

Figure 4:
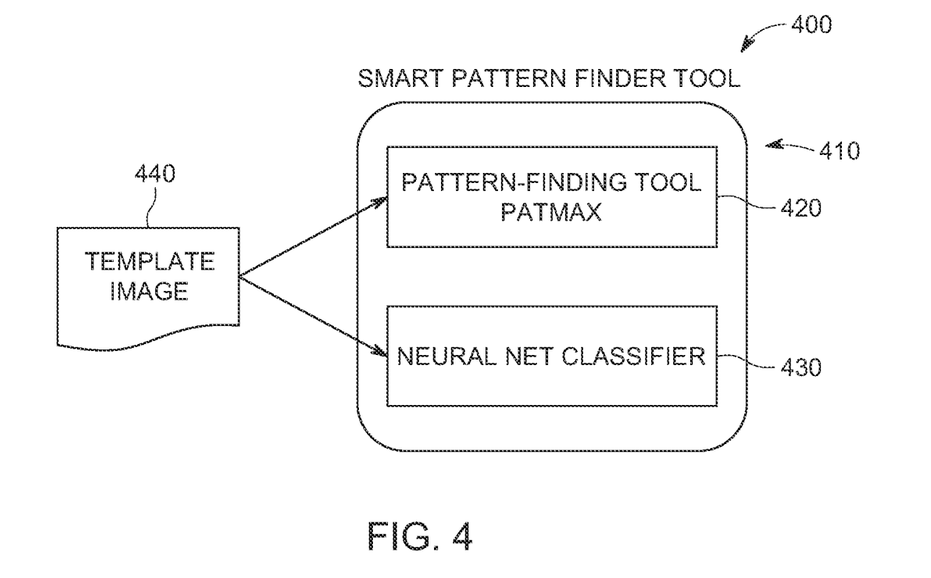
FIG. 4 is a block diagram showing the training procedure for a smart pattern-finding tool including a neural network classifier and a pattern-finding tool that are trained on one or more images for a single template.

FIG. 4 shows an arrangement in which the traditional pattern-finding tool finds a certain pattern and the neural net classifier determines whether it is the correct match (i.e. post classification). At train time, the traditional pattern-finding tool 410 is trained with a single image template 440. A neural net classifier (e.g. TensorFlow) 430 associated with tool 410 is then trained on multiple images for the desired template. The inputs of the classifier 430 is the same image as was input to the traditional pattern finding tool 440.

Figure 5:
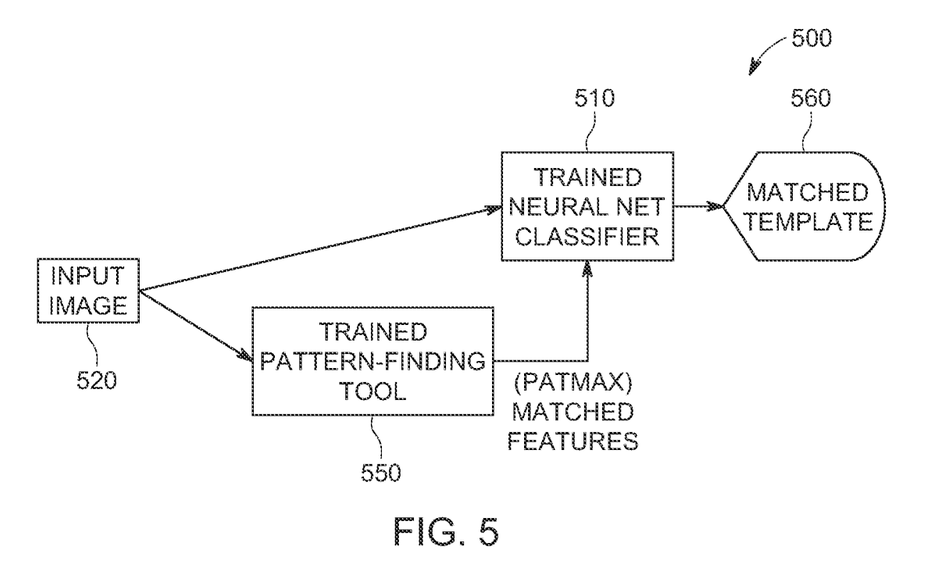
FIG. 5 is a block diagram of a runtime operation on an input image using the trained smart pattern-finding tool of FIG. 4 where the neural net classifier runs after the pattern-finding tool.

FIG. 5 depicts a runtime procedure (using post classification) 500, in which the pattern-finding tool 550 first finds the pattern in the input image 520. The input image 520 is provided to the trained neural net classifier 510 along with an optional bounding box computed from the outputs of the traditional pattern-finding tool (e.g. PatMax®). The classifier 510 then determines whether the traditional pattern finder has found the correct/matched pattern 560. The output of the classifier 510 is the overall confidence that the trained template was found.

By way of example, an operational use case involves highly confusable shapes with minor differences such as circles versus circles with a notch. Suppose the traditional pattern-finding tool (e.g. PatMax®) 350 is trained on a template image depicting a circle with a notch. A neural net classifier 510 is then trained on images that contain the desired shape (circle with a notch) along with other confusable shapes (circle without a notch). At run time, the input image along with an optional bounding box computed from the outputs of the traditional pattern-finding tool are fed to the trained neural net classifier 510, and then the classifier determines whether the traditional pattern finder has found the correct pattern (circle with a notch). The procedure improves the robustness of pattern finding in this exemplary case.

Note that the traditional pattern finding tool and its capability to train on one or more templates is highly variable in alternate embodiments. The above-described pre-classification and post-classification procedures can each be modified to include a different type of pattern-finding tool and associated templates in alternate embodiments.

III. Pattern-Finding Using Trained Pattern Tool to Refine Search

Figure 6:
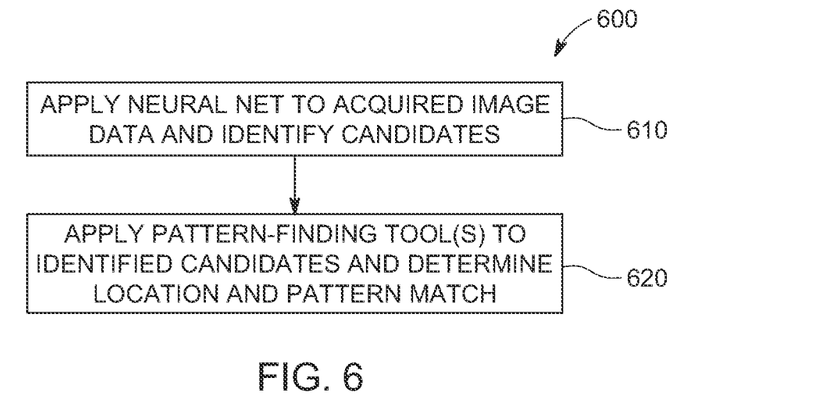
FIG. 6 is a flow diagram showing an overview of a procedure for applying a neural network to initially search for/determine candidates in an image and then applying a pattern-finding tool to refine the search/determination.

Reference is made to FIG. 6, which shows an overall (generalized) procedure 600 for smart pattern-finding according to a further exemplary embodiment that can be implemented by the arrangement 100 of FIG. 1. It is contemplated that some patterns may prove more challenging to locate using a conventional, trained pattern finding tool operating on an acquired image. In some instances, the inherent characteristics of a neural network/deep-learning architecture can afford benefits in initially locating pattern candidates in the image. Thus, in the procedure 600 the neural network is trained to locate various pattern types and is applied to the acquired image in step 610. This generates a list of candidates with associated scores for a given type of shape. Based on the scores, the procedure 600 then applies (step 620) the conventional, pattern-finding tool (e.g. PatMax® MultiModel) to the shape candidates that score above a certain threshold value. The pattern-finding tool searches for the particular shape identified by the neural network, or it can search for various types of shapes in each candidate.

Advantageously, the neural network can efficiently identify possible candidates, while computationally heavy tasks, such as sub-pixel-level model fitting can be handled in a robust manner by the pattern-finding tool.

Figure 7:
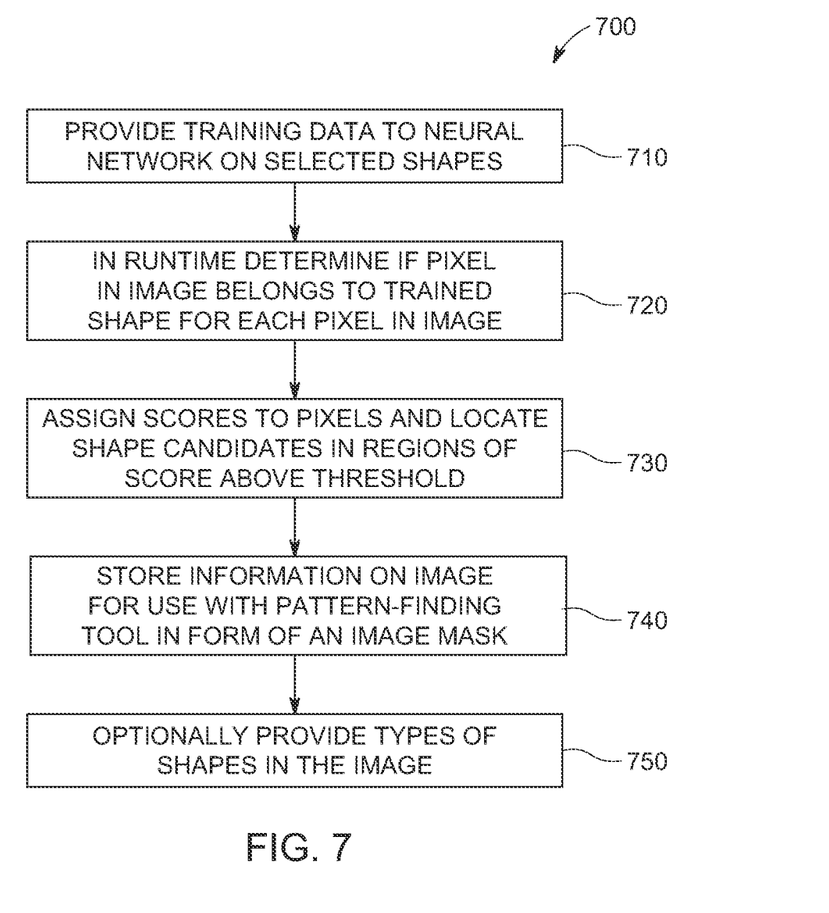
FIG. 7 is a flow diagram showing the training and runtime operation of the neural network in the procedure of FIG. 6.

Training of the neural network to recognize certain shapes is described in step 710 of the procedure 700 of FIG. 7. Once trained, during runtime (step 720) the neural network uses the trained configuration to assign a score (probability) to each pixel in the acquired image based upon whether it appears to be part of a trained shape. The result (step 730) is a probability image in which the pixels in the image each have assigned scores. The probability image from step 730 can be stored and then provided (e.g. as a mask) to the pattern-finding tool—in which pixels that do not appear to have candidate shapes are masked out of the image results that the pattern-finding tool operates upon (step 740). The neural network results can include the type(s) of candidate shapes in the probability image. The shape type information allows the pattern-finding tool to narrow its search in the probability image (at selected locations) exclusively to the shape types provided by the results (step 750). Hence the pattern-finding tool can operate more quickly and efficiently as it avoids running tools that are not relevant to the candidate shapes.

The above procedure 600 is advantageous in a variety of applications. For example, the use of a neural network to initially screen the image is useful where there is high local distortion, as the neural network essentially reconstructs the image based upon probabilities in a manner that is more-straightforward to be analyzed by the pattern-finding tool. By way of example, the incoming image can be highly textured and lacking defined contrast lines. After processing via the neural network, the resulting probability image is a binary representation with high-contrast, defined boundaries representing (e.g.) a rectangle, triangle, circle, etc. In a particular example, the neural network can effectively resolve the shape at the end of a rope or cable that can be frayed (creating a highly textured region). The neural network delivers a light rectangle on a dark background to the pattern-finding tool—or vice versa.

Figure 8:
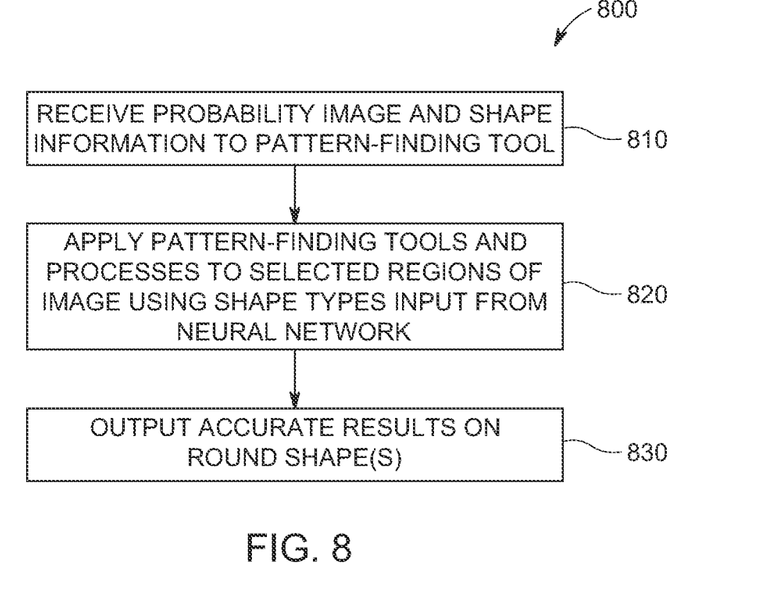
FIG. 8 is a flow diagram showing the runtime operation of the pattern-finding tool employing image results provided by the neural network procedure of FIG. 7.

As described in the procedure 800 of FIG. 8, during runtime, the trained pattern-finding tool (which has been trained with model-based templates related to shapes of interest) receives the probability image (mask) from the neural network and (optionally) information as to the types of candidate shapes identified in the image (step 810). The pattern-finding tool operates on the image, focusing on the selected regions and using tools and processes relevant to the identified image types (step 820). The pattern-finding tool then generates results in which a found shape(s) is/are located within the image and appropriate coordinate (and other) data on the shape(s) is output to follow-on operations in step 830.

Figure 9:
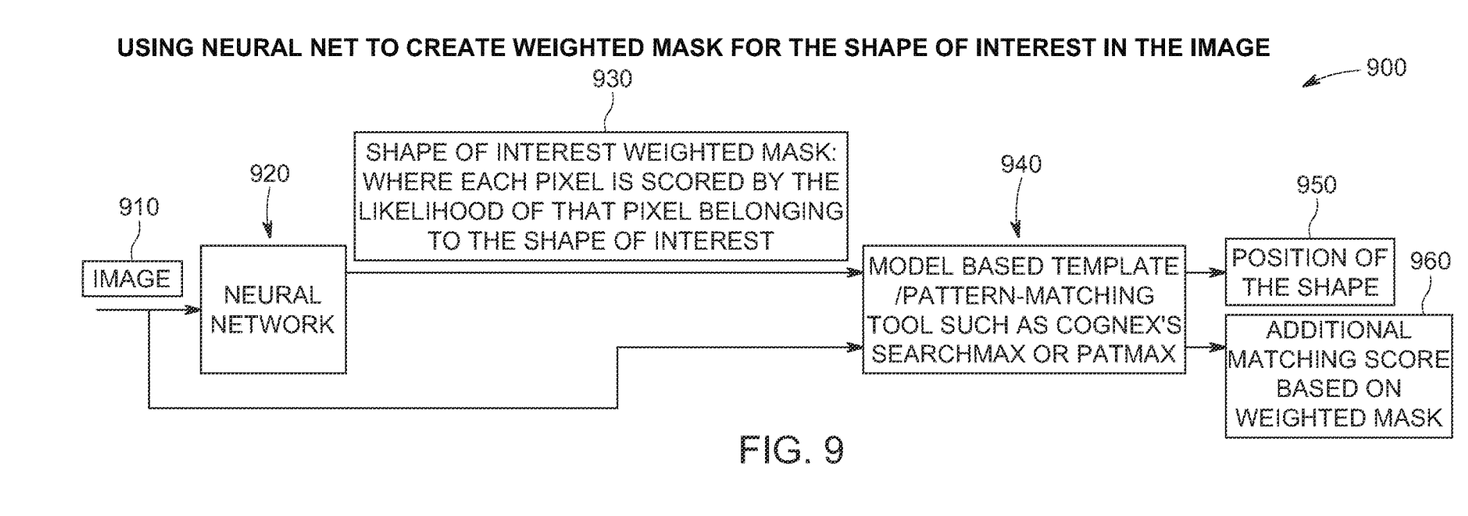
FIG. 9 is a block diagram showing the creation of a weighted mask in relation to the pattern-finding tool of FIG. 5.

Reference is further made to FIG. 9, which shows a block diagram of an exemplary procedure 900 for creating and employing a weighted mask in relation to a shape of interest in the acquired image. As shown, the image 910 is input to the neural network 920. Using appropriate trained techniques, the neural network 920 outputs the weighted mask for the shape of interest 930. As described above, each pixel is scored based upon its likelihood of being part of the shape of interest. The weighted mask 930, along with the raw image data 910 is then input to the pattern-finding (template-matching) tool (e.g. Cognex SearchMax®, PatMax®, etc.). The tool 940 thereby outputs the position of the shape of interest within the image 950 and additional matching score information 960, which can be based upon the data contained in the weighted mask 930.

Figure 10:
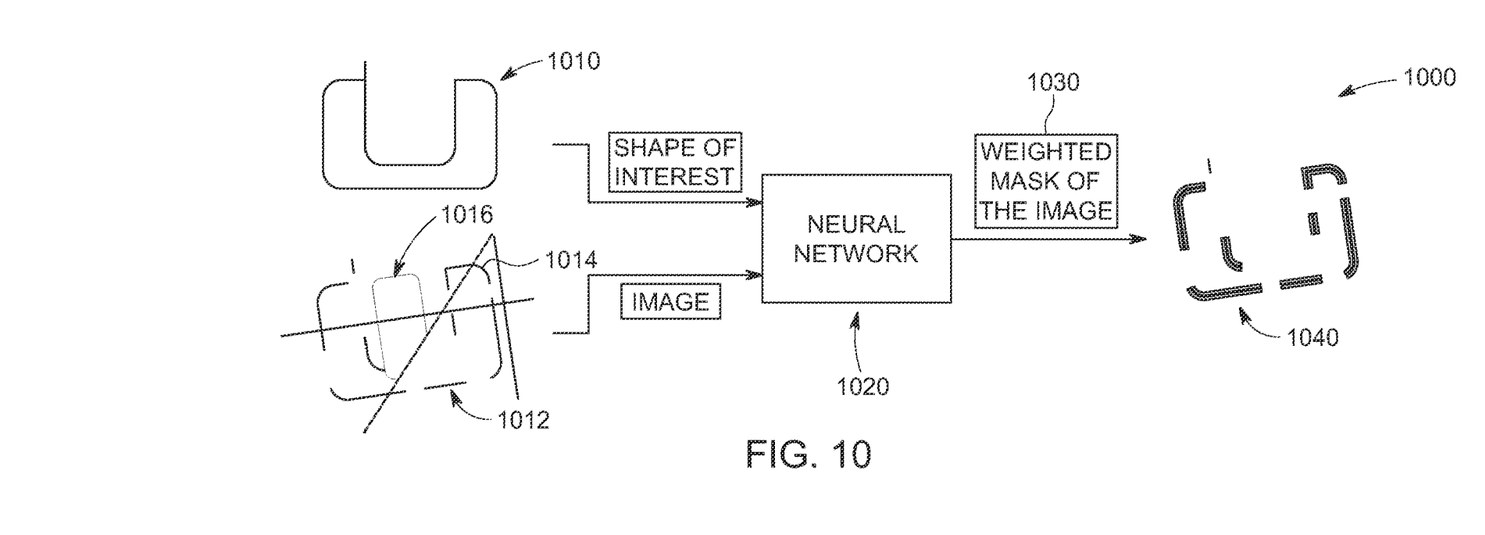
FIG. 10 is a diagram showing the processing of an exemplary shape of interest and acquired image data containing the shape of interest and a model of the shape of interest to generate a weighted mask in accordance with FIG. 9.

The procedure 900 is depicted graphically in the diagram 1000 of FIG. 10. The exemplary shape of interest 1010 is shown as a U-shaped structure with a continuous border. The associated acquired image 1012, however, provides a broken border 1014 and an intervening shape 1016. Additionally, the image shape of interest 1012 is rotated at an angle within the scene relative to the orientation of the expected shape 1010. Other distortion-based differences between the acquired image and expected shape can also be present. The shape of interest data 1010 and image data 1012 are input to the neural network 1020 as described herein. The resulting, output weighted mask 1030 of the image is represented as a series of shape segments 1040 that approximate the underlying shape of interest, and omit the intervening shape data 1016. As shown, the segments 1040 encompass a range of surrounding pixels with higher probability/likelihood. This region approximates the general contour of the edge of the shape of interest. This representation 1040 is more readily matched by a conventional, model-trained pattern-finding (template-matching) tool.

In another exemplary embodiment, the neural network can be employed to reconstruct and/or clean-up a shape of interest within an image. As shown in the procedure 1100 of FIG. 11, the neural network 1120 receives acquired image data 1110 and employs training to output a reconstruction of the shape of interest 1130, in which each pixel is scored by the likelihood that it belongs to the shape of interest (that is the subject of the neural network's training). The reconstruction is then input to the model-based pattern-finding (template-matching) tool 1140 that includes a template of the shape of interest. The tool outputs a coarse position of the shape of interest 1150. This coarse position can be used by downstream processes where appropriate and/or can be optionally input again to a model-trained pattern-finding tool 1160 (either the same tool as block 1140 or a different tool). The raw image data 1110 is also provided to the pattern-finding tool 1160. The output of the tool 1160 from the inputs 1110 and 1150 is a fine position 1170 of the shape of interest in the image 1110.

Figure 11:
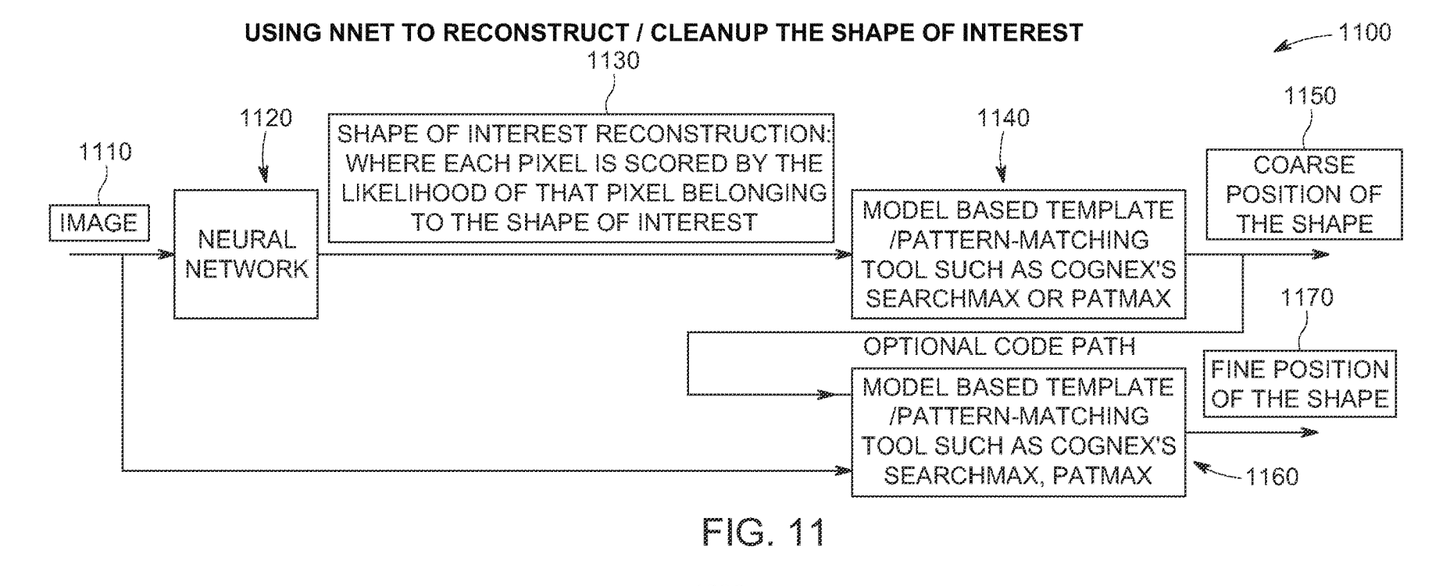
FIG. 11 is a block diagram showing the use of a neural network in accordance with FIG. 5 to reconstruct or clean up a shape of interest in acquired image data.
Figure 12:
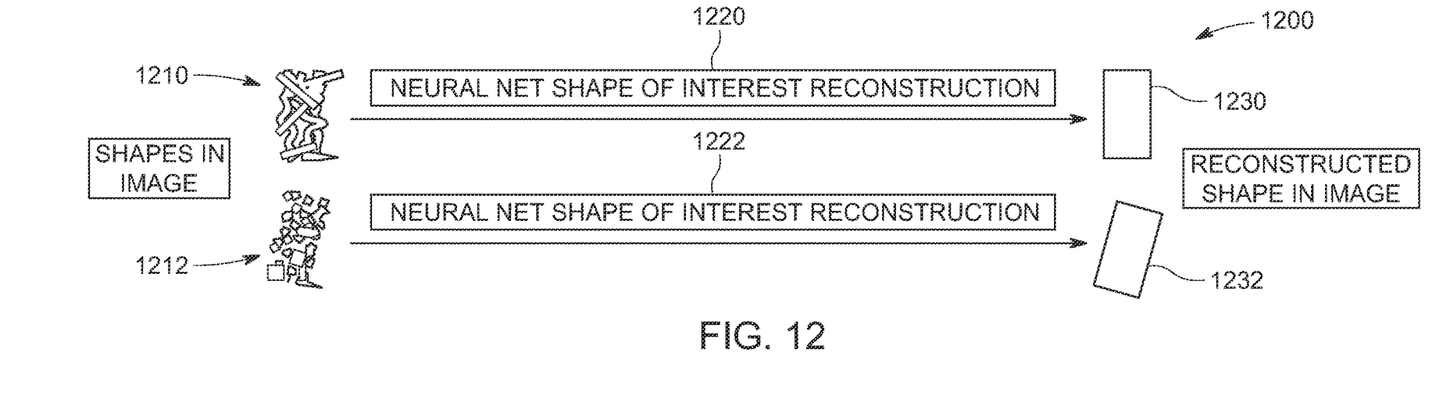
FIG. 12 is a diagram showing the processing of an exemplary, acquired image data containing a shape of interest to generate a reconstructed and/or cleaned-up version of the shape (e.g. as a binary image) in accordance with FIG. 11.

By way of example of the procedure 1100, the diagram 1200 of FIG. 12 shows two input shapes 1210 and 1212 in the image. Each shape is subjected to neural network reconstruction 1220 and 1222 as described above. This yields reconstructed shapes 1230 and 1232 for use in the acquired image data, respectively. The reconstructions can thereby replace the existing, distorted or unclear shapes. Hence, the neural network can be used to effectively provide a clean-up and/or reconstruction of an incomplete or distorted shape in image data, that can allow such data to be used more effectively by downstream operations—including pattern-finding, using the above-described pattern-finding tool or another appropriate tool. As shown, the shape can be represented as a binary image with well-defined boundaries that comport to those of the expected/model shape.

IV. Conclusion

It should be clear that the above-described system and method provides a more reliable and faster technique for finding and matching trained patterns using a combination of a traditional pattern-matching application and a neural net classifier. This approach allows the number of templates to be reduced or for found patterns to be filtered, so that the system and method's decision making on correct matches is enhanced. Moreover, the above-described system and method effectively enables a neural network to be employed as an imaged shape reconstruction/cleanup tool, and/or to eliminate pixels less relevant to the shape of interest, therefore reducing the search time, as well significantly increasing the chance of lock on the correct shapes. This technique is effectively particularly where the shape in the image is distorted or there are missing shape features.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub—processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for pattern-finding in a runtime image captured during a manufacturing process comprising:
    a pattern-finding tool that is trained based upon one or more template image(s) related to one or more training image(s) containing a pattern of interest corresponding to a part within the manufacturing process;
    a neural net classifier trained on the one or more training image(s);
    a template matching process in which, during runtime of the manufacturing process, either:
    (a) the trained neural net classifier provides one or more template image(s) based on a runtime image of the part to the pattern-finding tool, and the trained pattern-finding tool performs pattern matching based upon the one or more template image(s) combined with the runtime image of the part, or
    (b) the trained pattern-finding tool provides found patterns from a runtime image of the part to the trained neural net classifier, and the trained neural net classifier performs pattern-matching based on the found patterns and the runtime image of the part.

2. The system as set forth in claim 1 wherein the pattern-finding tool is adapted to be trained using a plurality of the template image(s).

3. The system as set forth in claim 1 wherein the pattern-finding tool is adapted to be trained on one template image.

4. The system as set forth in claim 1 wherein the trained neural net classifier is associated with a neural network.

5. The system as set forth in claim 4 wherein the neural network is trained to locate one or more candidate shapes in the one or more training image(s), and arranged to identify probability of the presence of the one or more candidate shapes in the runtime image during the manufacturing process.

6. The system as set forth in claim 5 wherein the neural network generates (a) a weighted mask having features of the one or more candidate shapes that exceed a probability threshold or (b) a reconstructed image in which the features of a model of the one or more candidate shapes are substituted in the runtime image where the neural network identifies presence of the features of the one or more candidate shapes that exceed the probability threshold.

7. The system as set forth in claim 6 wherein the neural network defines the weighted mask in which each pixel therein has a score related to identification of the one or more candidate shapes.

8. The system as set forth in claim 6 wherein the neural network provides data as to presence of a type of the one or more candidate shapes to the pattern-finding tool and the pattern finding tool limits processes to those related to locate the type.

9. The system as set forth in claim 5 wherein the neural network comprises a convolutional neural network (CNN).

10. The system as set forth in claim 6 wherein the reconstructed image is defined as a binary image.

11. A system for pattern-finding in a runtime image captured during a manufacturing process and including a part, comprising:
    a neural network trained to locate one or more candidate shapes in an image of the part, and arranged to identify probability of the presence of the one or more candidate shapes in the runtime image during the manufacturing process and thereby generates:
    (a) a weighted mask having features of the one or more candidate shapes that exceed a probability threshold, and
    (b) a reconstructed image in which the features of a model of the one or more candidate shapes are substituted in the runtime image where the neural network identifies presence of the features of the one or more candidate shapes that exceed the probability threshold.

12. The system as set forth in claim 11 further comprising a pattern-finding tool that is trained using one or more models relative to the one or more candidate shapes to find the one or more candidate shapes in (a) the weighted mask and (b) the reconstructed image.

13. The system as set forth in claim 12 wherein the neural network provides data as to presence of a type of the one or more candidate shapes to the pattern-finding tool and the pattern finding tool limits processes to those related to locate the type.

14. The system as set forth in claim 12 wherein the pattern-finding tool is trained on a single candidate shape.

15. The system as set forth in claim 11 wherein, the weighted mask includes a plurality of pixels and wherein each of the pixels therein has a score related to identification of the one or more candidate shapes.

16. The system as set forth in claim 11 wherein the reconstructed image is defined as a binary image.

17. The system as set forth in claim 11 wherein the neural network comprises a convolutional neural network (CNN).

18. A system for pattern-finding in a runtime image captured during a manufacturing process and including a part, comprising:
    a neural network trained to locate one or more candidate shapes in an image of the part, and arranged to identify probability of the presence of the one or more candidate shapes in the runtime image during the manufacturing process and thereby generates a weighted mask having features of the one or more candidate shapes that exceed a probability threshold.

19. The system as set forth in claim 18 further comprising a pattern-finding tool that is trained using one or more models relative to the one or more candidate shapes to find the one or more candidate shapes in the weighted mask.

20. The system as set forth in claim 19 wherein the neural network generates a reconstructed image that defines a binary image.

* * * * *